United States Patent Office 2,970,055
Patented Jan. 31, 1961

2,970,055

TRIGLYCERIDE SHORTENING COMPOSITION AND METHOD FOR PREPARING THE SAME

John J. Gleason, Cedar Falls, Iowa, assignor to The Rath Packing Company, Waterloo, Iowa, a corporation of Iowa No Drawing. Filed Dec. 14, 1959, Ser. No. 859,135

10 Claims. (Cl. 99—118)

This invention relates to improved shortening compositions especially useful for preparing bakery products, such as cakes. The shortening compositions are characterized by improved creaming ability, storage stability and emulsifying properties. Cakes containing the shortening of the invention have a fine uniform texture, are extremely light, and remain moist for four or five days after baking, even when exposed to air.

The compositions consist of edible triglyceride fats which have been modified by the substitution, for an original fatty acid radical, of an organic hydroxy carboxylic acid having from two to six carbon atoms. These acids are characterized by the presence of the radical: —CHOH—COOH. The hydroxy carboxylic acids found to be suitable in practicing the invention may be taken from the group consisting of lactic, tartaric, malic, glycollic, glyceric and gluconic. It appears that the presence of the acid radical containing the OH group imparts the desirable characteristics above noted to the triglyceride fats.

Edible animal and vegetable triglycerides (containing no substantial quantities of mono- and diglycerides) which are commonly used as shortenings may be used in the preparation of the shortening compositions of the invention. Such shortenings, modified by the substitution of hydroxy acid radicals for a small number of the original fatty acid radicals, are preferably mixed with an untreated glyceride shortening to prepare a commercial shortening product.

In a preferred form of the invention the triglyceride fat, for example lard, is molecularly rearranged in the presence of an interesterification catalyst at a temperature slightly above room temperature for a period of time ranging from two to sixty minutes, in the absence of air. From 0.1% to 3% by weight of the hydroxycarboxylic acid, for example lactic acid, is added to the rearranged material. This quantity of acid permits substitution on the average in about one out of every three to one hundred molecules of the triglyceride. Expressed in terms of moles, I may use from .01 to .3 mole of the hydroxy acid for each mole of fat. After adding the hydroxy acid the reaction is continued under the same conditions for an additional one-half to three hours. It appears that the hydroxy acid radicals replace some of the fatty acid radicals normally present in the triglyceride. This is substantiated by the fact that the free fatty acid content of the end product (before washing) is increased considerably over that of the original triglyceride fat. The exact nature of the molecular rearrangement and the hydroxy acid substitution is not completely understood. Experts in the art are not in accord as to whether the initial reaction here referred to and which takes place in the presence of the catalyst actually causes the fatty acid radicals to change places with each other (interesterification) or whether isomers are formed in some other manner. The chemistry of the fatty materials is complex. It will be appreciated that in dealing with any naturally occurring substance, such as animal and vegetable fats, the chemical composition of the original material will vary considerably. Consequently, the end product cannot be accurately identified either with respect to the rearrangement or interesterification that takes place or as to the precise way in which the hydroxy acids add to the fat. Nevertheless, the reaction as defined does provide a greatly improved plastic shortening having a good consistency over a relatively wide temperature range in addition to the greatly improved emulsifying property.

My invention also may be carried out by adding the hydroxy acid to the triglyceride fat before any molecular rearrangement has occurred. In other words, the acid is added to the fat first, followed by addition of the catalyst and raising the temperature to bring about rearrangement and substitution simultaneously.

The fatty acids suitable for use in the invention include lard, tallow and hydrogenated vegetable oils such as cottonseed, soya, coconut, corn, peanut and the like.

The temperatures at which the reaction takes place may range from room temperature to 200° C. At the higher temperatures the reaction, of course, is carried out completely in the liquid phase. I prefer, however, to carry out the reaction at a temperature below that at which the liquid phase is saturated with respect to the relatively high melting triglycerides present in the fat so that such high melting triglycerides formed during the interchange of fatty acid radicals will crystallize from the liquid fat and take no further part in the rearrangement process. When molecules of low solubility in the liquid fat phase are formed and crystallize out, further rearrangement of such molecules is prevented. The preferred temperature range is from room temperature to about 50° C., depending upon the particular fat being treated and the type and quantity of catalyst used. It is apparent that the melting point of the fat will determine the precise temperature range employed. The temperature is preferably not raised above the point at which some of the fat remains in the solid phase. Stated conversely, at least some of the fat will be in the liquid phase.

The time of reaction will vary from thirty minutes to six hours, preferably from two to four hours depending upon the temperature, concentration and nature of the catalyst and the particular triglyceride fat being treated. The invention contemplates the use of well known catalysts, such as the alkali metal alcoholates and inorganic salts. Suitable inorganic salts are stannous chloride, zinc acetate, zinc oxide, lead acetate, cobalt nitrate, ferrous hydroxide, bismuth nitrate and titanium tetrachloride. The quantity of catalyst used may range from slightly more than zero up to 1% to 2%. Over 1% the accelerating effect of the catalyst begins to wane. One of the most effective catalysts is sodium methylate.

Although the hydroxy acid modified triglyceride shortening may be used alone in certain applications, I prefer to mix it to the extent of 3% to 50% by weight with another shortening not so modified. The mixture is particularly suitable for bakery products.

The following examples illustrate the invention.

*Example I*

One thousand grams of vacuum dried, caustic refined lard were mixed with .2% sodium methylate catalyst and permitted to undergo rearrangement for about two minutes. Two percent edible lactic acid by weight was then added to the lard and the reaction was continued for two hours in vacuo at a temperature ranging not higher than 30° C. At the end of this period the catalyst was removed by water washing the end product three times, drying under vacuum and bleaching. The cooling curves indicated that the molecular rearrangement of the lard had been effectively completed. The normal crystal habit of the lard was completely modified. The end product exhibited remarkable creaming and emulsifying properties.

Example II

One thousand grams of vacuum dried, caustic refined lard were mixed with .2% sodium methylate catalyst and the temperature was elevated to about 30° C. and held at that point for about one hour. Two percent by weight of edible lactic acid was then added to the thus rearranged lard and the reaction was carried on for an additional one hour under vacuum at the same temperature. After the two hour reaction period, the catalyst was removed by washing the end product three times with water, drying under vacuum and bleaching. Again the cooling curves indicated excellent rearrangement. The end product showed excellent creaming and emulsifying properties, even superior to the product of Example I.

To test the effectiveness of the modified shortenings prepared in accordance with Examples I and II, several cakes were baked using the shortenings of these examples in comparison with shortenings which were not modified by reaction with lactic acid. Cake shortening compositions were prepared by mixing 5% by weight of the product of Examples I and II with 95% of a standard rearranged lard shortening compound. Cake batters were prepared using a commercial dry cake mix and the three different shortening compositions. After the cakes were baked, the cake volume, the grain and the texture were determined with the following results:

| Sample | Grain | Texture | Volume |
|---|---|---|---|
| Control | Good | Good | 323 |
| Shortening Modified with Product of Example I | Very Good | Very Good | 342 |
| Shortening Modified with Product of Example II | Excellent | Excellent | 353 |

After five days' exposure to the atmosphere, the control cake was dry and hard whereas the cakes employing the shortening of the invention had retained their softness and moisture.

Examples III-V

Vacuum dried, caustic refined lard was modified by rearranging in the presence of a catalyst under the conditions specified in Example II, except that gluconic acid or tartaric acid was substituted for lactic acid. The proportions were the same. The modified lard was then substituted in the amount of 10% by weight for the same quantity of regular rearranged lard containing no alpha-hydroxy carboxylic acid radicals in the following shortening formulas:

| | Percent By Weight | | |
|---|---|---|---|
| Example | III | IV | V |
| Regular Rearranged Lard | 68 | 58 | 58 |
| Gluconic Acid Rearranged Lard | | 10 | |
| Tartaric Acid Rearranged Lard | | | 10 |
| Cottonseed Oil | 20 | 20 | 20 |
| Cottonseed Oil Flakes | 12 | 12 | 12 |

To each of these shortenings standard monoglyceride emulsifiers were added in the amount of about 3%. Cakes were prepared from these shortenings and a fat-free, dry cake mix formula. The cake volume was as follows:

| Example | III | IV | V |
|---|---|---|---|
| Cake Volume | 265 | 335 | 333 |

The grain of the baked cake of Examples IV and V was was superior to that of Example III.

Examples VI-VIII

Modified lard was prepared in accordance with Example II using glycollic or malic acid in place of lactic acid. These particular acids do not go into solution at the 30° C. reaction temperature. Therefore, a small amount of the rearranged lard was removed from the vat after the initial one hour rearrangement and 3% by weight of the glycollic or malic acid was added thereto and the mixture heated to above the melting point of the particular acid, namely 63° C. for glycollic and 100° C. for malic. The acids remained in solution after cooling to 30° C. for the substitution reaction. Shortening samples were made up in accordance with the following formulas:

| | Percent By Weight | | |
|---|---|---|---|
| Example No. | VI | VII | VIII |
| Composition A: | | | |
| Regular Rearranged Lard | 58 | 58 | 68 |
| Glycollic Acid Rearranged Lard | 10 | | |
| Malic Acid Rearranged Lard | | 10 | |
| Hydrogenated Cottonseed Oil | 20 | 20 | 20 |
| Cottonseed Oil Flakes | 12 | 12 | 12 |
| | 100 | 100 | 100 |
| Composition A | 95 | 95 | 95 |
| Monoglyceride Emulsifier | 5 | 5 | 5 |
| Cake Baking Results: | | | |
| Cake Volume | 359 | 350 | 308 |
| Symmetry | Good | Good | Good |
| Grain and Structure | Very Good | Very Good | Very Good |
| Tenderness | Very Good | Very Good | Very Good |

This application is a continuation-in-part of my co-pending application Serial No. 660,043, filed May 20, 1957, now abandoned.

It will be apparent to those skilled in the art that various modifications may be made in carrying out the reactions of the invention without departing from the spirit and scope of the invention.

What I claim as new and desire to secure by Letters Patent of the United States is:

1. An improved edible shortening composition prepared by molecularly rearranging a triglyceride fat substantially free of mono- and diglycerides in the presence of an interesterification catalyst at a temperature at which at least some of the fat remains in the liquid phase, adding from 0.1% to 3% by weight of a hydroxycarboxylic acid taken from the group consisting of lactic, gluconic, tartaric, malic, glyceric and glycollic, and continuing the reaction under the same conditions to cause substitution of said hydroxy acid for some of the fatty acid radicals originally present in the triglyceride fat.

2. An improved edible shortening composition prepared by molecularly rearranging a triglyceride fat substantially free of mono- and diglycerides in the presence of from 0.1% to 3% by weight of a hydroxycarboxylic acid taken from the group consisting of lactic, gluconic, tartaric, malic, glyceric and glycollic to cause substitution of hydroxy acid radicals for some of the fatty acid radicals originally present in the triglyceride fat, the reaction being carried out in the presence of an interesterification catalyst and at a temperature at which some of the triglyceride fat remains in the solid phase.

3. The composition of claim 2 wherein the hydroxycarboxylic acid radicals are lactic acid radicals.

4. The composition of claim 2 wherein the hydroxycarboxylic acid radicals are lactic acid radicals and the triglyceride fat is lard.

5. A mixture of 3% to 50% of the shortening of claim 1 and an edible glyceride shortening.

6. A mixture of 3% to 50% of the shortening of claim 4 and an edible glyceride shortening.

7. A method for preparing an improved edible shortening which comprises rearranging a triglyceride fat substantially free of mono- and diglycerides by heating said triglyceride fat to a temperature at which at least some of the constituents thereof are molten, said heating being carried out in the presence of less than 1% by weight of sodium methylate catalyst, adding from 0.1% to 3% by weight of lactic acid and continuing the reaction at said temperature until the lactic acid radical of said quantity of lactic acid added has replaced the fatty acid radical in some of the triglyceride molecules of said fat.

8. The process of claim 7 wherein said triglyceride fat is lard and said temperature is below about 30° C.

9. A method for preparing an improved edible shortening which comprises rearranging a triglyceride fat substantially free of mono- and diglycerides by heating said triglyceride fat to a temperature at which all of the constituents thereof are molten, said heating being carried out in the presence of less than 1% by weight of sodium methylate catalyst, adding from 0.1% to 3% by weight of a hydroxycarboxylic acid taken from the group consisting of lactic, tartaric, malic, glycollic, glyceric and gluconic, and continuing the reaction at said temperature until the hydroxycarboxylic acid radical of said quantity of acid added has replaced the fatty acid radical in some of the triglyceride molecules of said fat.

10. An improved edible shortening composition prepared by molecularly rearranging a triglyceride fat substantially free of mono- and diglycerides in the presence of from 0.1% to 3% by weight of a hydroxycarboxylic acid taken from the group consisting of lactic, tartaric, malic, glycollic, glyceric and gluconic to cause substitution of hydroxycarboxylic acid radicals for some of the fatty acid radicals originally present in the triglyceride fat, the reaction being carried out at a temperature at which all of the fat is in the liquid phase but below 200° C. and in the presence of an interesterification catalyst.

References Cited in the file of this patent

UNITED STATES PATENTS

| | | |
|---|---|---|
| 2,378,006 | Eckey | June 12, 1945 |
| 2,442,532 | Eckey | June 1, 1948 |
| 2,480,332 | Little | Aug. 30, 1949 |
| 2,509,414 | Barsky | May 30, 1950 |
| 2,690,971 | Iveson et al. | Oct. 5, 1954 |